United States Patent [19]

McClelland

[11] Patent Number: 4,594,805
[45] Date of Patent: Jun. 17, 1986

[54] FISHING ROD HOLDER

[76] Inventor: Paul R. McClelland, Rte. 1, Box 61, Coolville, Ohio 45723

[21] Appl. No.: 713,595

[22] Filed: Mar. 19, 1985

[51] Int. Cl.⁴ .............................................. A01K 97/10
[52] U.S. Cl. .................................... 43/21.2; 248/520; 248/528
[58] Field of Search ......................... 43/17, 21.2, 54.1; 248/519, 520, 528, 529, 533

[56] References Cited

U.S. PATENT DOCUMENTS

| | | | |
|---|---|---|---|
| 2,606,731 | 8/1952 | Harris | 43/21.2 |
| 2,645,050 | 7/1953 | Golias | 43/21.2 |
| 2,774,563 | 12/1956 | Pribis | 43/21.2 |
| 2,783,009 | 2/1957 | Petterson | 43/21.2 |
| 3,724,115 | 4/1973 | Derie | 43/21.2 |
| 4,156,982 | 6/1979 | Phillips | 43/21.2 |
| 4,479,322 | 10/1984 | Koppel | 43/21.2 |
| 4,523,403 | 6/1985 | Ivy et al. | 43/21.2 |

Primary Examiner—Nicholas P. Godici
Assistant Examiner—M. Jordan
Attorney, Agent, or Firm—Cushman, Darby & Cushman

[57] ABSTRACT

A support device for a fishing rod to keep that rod and an attached reel out of engagement with the ground. The device is comprised of an elongated base member having a length of about 18 inches and a fixed wall at one end as well as two pivotal walls, one attached at an intermediate position, the other attached at the opposite end. The intermediate wall is positioned from the fixed wall a distance of about 25% to 30% of the length of the base member and the height ratios of the fixed, the intermediate and the end pivoting wall is approximately 1:3:12.

5 Claims, 3 Drawing Figures

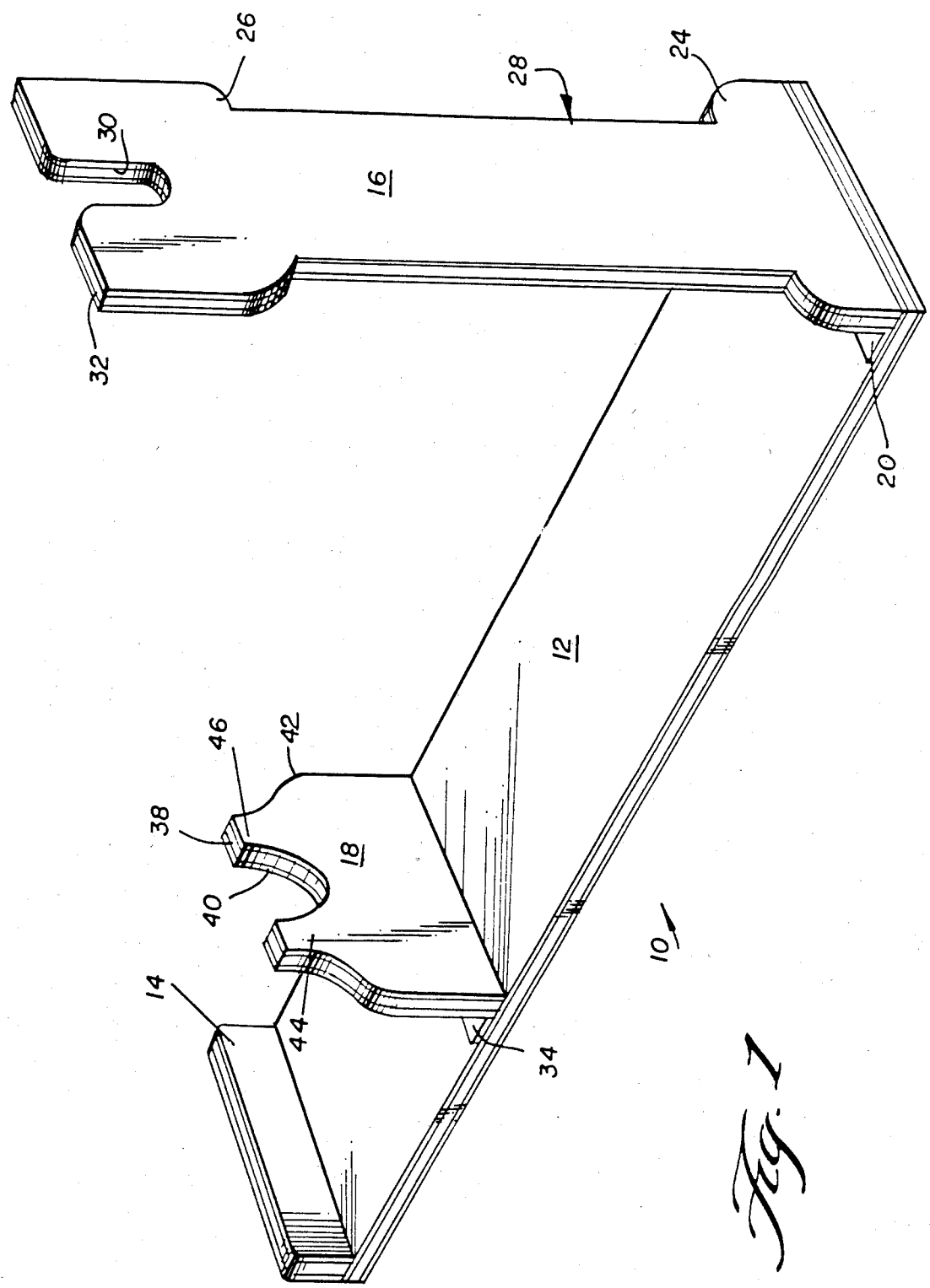

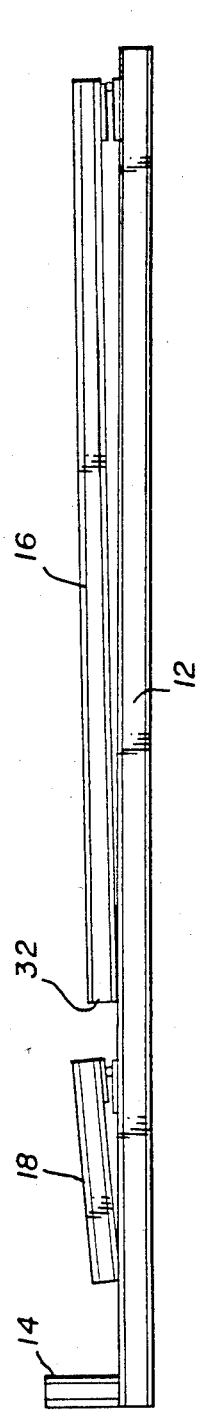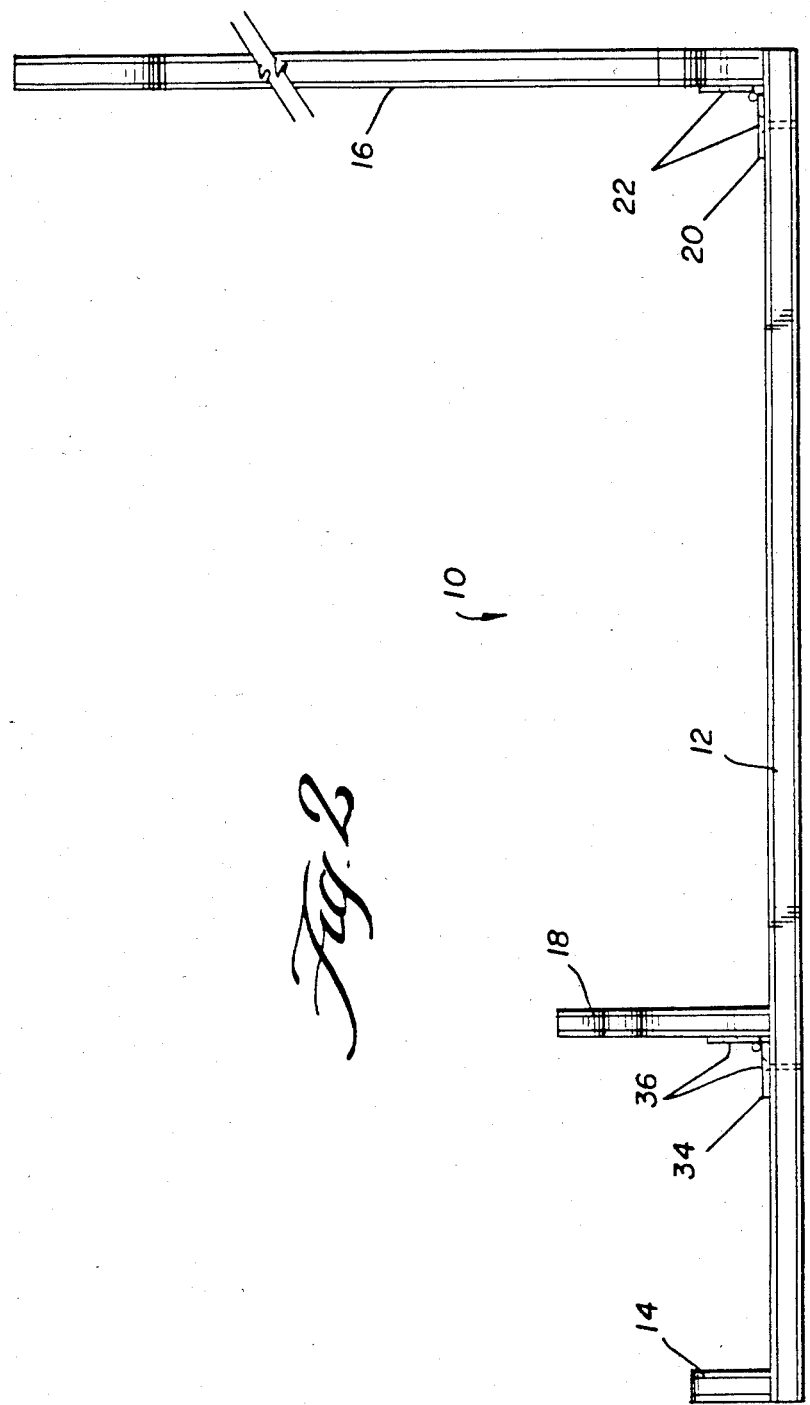

FISHING ROD HOLDER

FIELD OF THE INVENTION

The present invention relates to a holder for supporting a fishing rod to keep it out of contact with the ground and supported.

BACKGROUND OF THE PRESENT INVENTION

A number of ways to hold fishing rods have been developed over the years primarily to indicate when a fish had been caught or to set the hook as in Derie, U.S. Pat. No. 3,724,115 or in Barfield, U.S. Pat. No. 3,411,739. In Derie, the handle of the fishing rod is placed into a hole in a bottom board and then the outer portion of the rod is bent downwardly over an intermediate support and gripped by the hooked end of a front support pivotally connected at the front of the board. When a fish is caught, the end that has been hooked will be released and because the rod was bent downwardly and pulled against the fixed restriction, the released end of the rod will snap upwardly and set the hook in the fish's mouth. In Barfield, a V-shaped notch and support legs are formed out of a wire member. The fishing rod handle is then rested directly on the ground, but the tip end itself is held off the ground in the V-shaped notch.

Other forms of fishing rod holders are shown in Harris, U.S. Pat. No. 2,606,731; Knight, U.S. Pat. No. 3,159,366; and Gates, U.S. Pat. No. 3,327,978. Harris designed a holder for a rod and reel to keep them on board a boat. The holder includes a U-shaped portion, to receive the reel, that is mounted on one end of a bar. The front end of the bar is bent upwardly and is provided with a V-shaped notch for supporting the pole. Included at an intermediate position between the reel holder and the bent front end portion which includes the V-shaped notch is an adjustable mechanism for locking the pole in the device and a C-clamp is used to connect the holder to the boat. By mounting the reel in its holder and the rod in the V-notch, the rod can then be locked in place thereby preventing it from being accidentally dropped overboard. Knight discloses a holder that can be used on land, on a boat or from a pier and is designed to reproduce the effect of using a tubular shaped receptacle, as one would find in a fighting chair, and to receive just the handle end of the rod. That rod receptacle can be folded into a flattened position or unfolded into an upright, ready position and is hingable mounted to one end of a board to be able to pivot backward and forward during operation after a fish has been hooked. The user sits on at least a portion of the board to which the rod holder is pivotally attached with the end of the rod in the tubular receptacles.

Gates discloses a fishing rod support that can be pivotally secured to the top of a tackle box. The object of the support is to hold the rod, but also to assure that it will not be displaced. The holder is comprised of a series of wire or rod sections pivotally attached to each other and pivotally attached to either a base or the top of a tackle box and angled away from each other when in its raised, ready to use position. The device also includes a bail that will fit over the reel end of the fishing rod with an upper portion of the rod itself resting on a cross member formed in one of the angled sets of rods.

I am also aware of a collapsible gun rest as in Pribis, U.S. Pat. No. 2,774,563. The gun rest is comprised of a box structure that can be opened to define two upwardly open box halves, each of which is provided with a movable support member having a V-shaped notch at what will be an outer end. Each support member is pivotally mounted in its own box half, with the pivot connection being provided by a pin that extends through the box side walls and through an elongated slot within the support member. Accordingly, each notch member normally lies flat within its box portion and can be raised vertically with respect to the pivot pin. When pivoted into its use position, each member will be raised within the limits of the elongated slot during pivoting and then lowered into a receiving notch formed in the interior of the box. The box halves are connected together by means of a piano hinge and the two notched support members can be of different lengths.

SUMMARY OF THE PRESENT INVENTION

The present invention provides a very simple device for holding a fishing rod and its attached reel at rest. It provides a very convenient approach for keeping the rod and reel out of the dirt and/or sand while fishing so that one does not have to hold the fishing rod at all times. The rod holder is comprised of only four separate pieces that fold together into a flat and compact unit and will fit and work with all rods regardless of their length.

The device is comprised of a horizontal base member having a short end piece fixed at one end and two pivotally attached wall members, one being relatively long and attached to the opposite end from the fixed wall. The intermediate wall member is positioned between the two ends and is spaced from the end having the short fixed wall a distance approximately equal to 25% to 30% of the length of the base member. The intermediate wall member has a length equal to about 16% to 17% of the length of the base and the larger pivotal end wall has a length equal to about 66% of the length of the base. This allows both of the pivotally mounted wall members to be rotated so that they will lay in a substantially flat condition against the base member to make transport and carrying of the device to make transport and carrying of the device easy.

The upper surface of both the pivoted wall members are provided with notches or grooves with a notch in the short, pivotal wall member being larger to receive the handle portion of a fishing rod with the notch in the longer of the two wall members, at the opposite end from the fixed wall, being large enough to receive the rod portion of the fishing rod.

By keeping the progression of lengths of the three wall members in approximately a 1:3:12 ratio, the fishing rod will be kept at an angle so that the weight will be directed toward the back of the supporting base which will adequately support rods on the device regardless of their length.

Other objects, features, and characteristics of the present invention as well as the methods and operation and functions of the related elements of the structure, and to the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

FIG. 1 is a diagrammatic, perspective view of the present invention in its ready-to-use condition;

FIG. 2 is a side, elevational view of the apparatus shown in FIG. 1 with the walls in their raised, ready-to-use position as in FIG. 1; and FIG. 3 is a side, elevational view of the device according to the present invention with the pivotal walls folded down into their flat, carrying position.

DETAILED DESCRIPTION OF THE PREFERRED EMBODIMENT OF THE PRESENT INVENTION

Turning now to FIG. 1, the present invention relates to a fishing rod support device which is indicated generally at 10 and is comprised of a base member 12 that can be, for example, approximately 18 inches long and four inches in width. Fixed at one end is a short wall member 14 having the same width as the base member and, for example, approximately 1 inch in height. Positioned at the other end is a pivotally attached wall member 16 and an intermediate wall member 18 pivotally attached between walls 14 and 16.

The fixed end wall 14 is connected to the end of base 12 by any convenient means such as by glue, screws, nails or a combination thereof. Should this device be formed from plastic, wall 14 can be integrally molded as a one piece unit together with base 12.

Wall 16, for example, can be approximately 12 inches long or about 66% of the length of base 12 and is pivotally attached to the end of base 12 by means of a hinge 20 held in place by screws indicated at 22 in FIG. 2. End wall 16 is shown with shaped lower shoulders 24 and upper shoulders 26, thereby defining a recessed area indicated at 28 therebetween. However, it should be understood that a variety of shapes for this pivoting end wall can be employed. Located in the center of the top end surface 32 of wall 16 is an upwardly opening groove 30 which is approximately $\frac{1}{2}$ inch wide and approximately 2 inches deep.

The intermediate wall member 18 is also pivotally connected to base 12 by hinge shown at 34 which is connected to both wall and base by screws 36. Wall member 18 also has the same width as base member 12 and, for example, can be approximately 3 inches in length or about 16.5% of the length of base 12. Wall member 18 is provided within its top surface 38, an upwardly opening groove 40 that is approximately an inch in width and depth. The upper shaped surface of wall member 18 could have other configurations from that shown, but the arrangement of positioning groove 40 between shoulders 42 and upstanding members 44 and 46 is a convenient way of producing groove 40.

As shown in FIG. 3, with walls 16 and 18 in their folded conditions, their top, free ends lie in engagement with the upper surface of base 12 and together present a very flat, compact package that can be easily carried and/or stored. In order to use the device, walls 16 and 18 are pivoted into their upright condition as shown in FIGS. 1 and 2. In this position, intermediate wall 18 will be positioned about $4\frac{1}{2}$ inches from the interior surface of fixed wall 14. The distance between the front of intermediate wall 18 and the end of base 12 can be approximately $12\frac{3}{4}$ inches with hinge 20 being positioned about $\frac{3}{8}$ths of an inch in from that end of base 12. Accordingly, when in their flat position, the distance between the end 32 of wall 16 and the exposed bottom of intermediate wall 18 is about 1 inch. Thus, for a base that is about 18 inches long the height ratio for walls 14, 18 and 16 is approximately 1:3:12. Maintaining this proportion will assure that the weight of the fishing rod will be directed toward the rear of the rod and thus toward fixed end wall 14. I prefer to construct base 12 and walls 14–18 from wood and to employ non-rusting hinges. However, the base 12 and wall 14 could be a one piece molded unit comprised of any plastic, thermoplastic or thermosetting resin. Similarly, base 12 would be molded to include half of a hinge structure for receiving a mating, complementary hinge portion that could be molded at one end of walls 16 and 18. My device could also be constructed from other materials, including metals such as aluminum.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims, which scope is to be accorded the broadest interpretation so as to encompass all such modifications and equivalent structures.

I claim:

1. A fishing rod holder for supporting a fishing rod having handle, rod and reel portions and to prevent that rod and reel from coming into contact with the ground comprising a flat base member having an upper surface and two ends, a first wall member fixed at one end of said base member and extending above said upper surface a first predetermined height, second and third wall members each having two ends, one of which is pivotally attached to said upper surface, said second wall member being positioned between about 25% to 30% of the length of said base member from said fixed wall, the third wall member being attached at said other end of said base member, said second and third wall members extending above said upper surface at second and third predetermined heights, respectively, said first, second and third predetermined heights being about 5.5%, about 16.5% and about 66%, respectively of the length of said base member, and wherein said second and third wall members each include in the other unattached end means defining an opening upwardly handle and rod receiving grooves, respectively.

2. A fishing rod holder as in claim 1, wherein said holder is comprised of wood.

3. A fishing rod holder as in claim 1, wherein said holder is comprised of plastic.

4. A fishing rod holder as in claim 1, wherein said base and each of said walls are not greater than about four inches in width.

5. A fishing rod holder as in claim 1, wherein said base member has a length of about 18 inches and wherein with the ratio between said first, second and third predetermined heights being about 1:3:12.

* * * * *